United States Patent
Briscese (12)

(10) Patent No.: US 6,474,672 B1
(45) Date of Patent: Nov. 5, 2002

(54) ADJUSTABLE VEHICLE WITH MOVING SECTION FOR LOAD TRANSFER

(76) Inventor: Emanuele Briscese, Box 348, Notre Dame de Lourdes, Manitoba (CA), R0G 1M0

( * ) Notice: Subject to any disclaimer, the term of this patent is extended or adjusted under 35 U.S.C. 154(b) by 0 days.

(21) Appl. No.: 09/975,313

(22) Filed: Oct. 12, 2001

Related U.S. Application Data (63) Continuation of application No. 09/369,378, filed on Aug. 6, 1999, now abandoned, which is a continuation-in-part of application No. 09/096,485, filed on Jun. 10, 1998, now abandoned, and a continuation of application No. 08/906,905, filed on Aug. 6, 1997.

(30) Foreign Application Priority Data

Aug. 6, 1998 (WO) ...................................... CA98/00752

(51) Int. Cl.[7] .............................................. B60G 11/20
(52) U.S. Cl. ................................ 280/414.5; 280/43.23; 280/656
(58) Field of Search ............................... 280/414.5, 43, 280/43.11, 43.17, 43.18, 43.22, 43.23, 638, 656, 847, 848, 851, 159; 180/311

(56) References Cited

U.S. PATENT DOCUMENTS

| | | | |
|---|---|---|---|
| 2,478,795 A | 8/1949 | Whalen et al. | |
| 2,566,393 A | 9/1951 | Wolfe | |
| 2,766,050 A | 10/1956 | Stone | |
| 2,807,381 A | 9/1957 | Tegeler | |
| 3,062,558 A | 11/1962 | Krolicki | |
| 3,557,980 A | 1/1971 | Klaus | |
| 3,722,948 A * | 3/1973 | Walsh et al. ................ | 280/656 |
| 3,746,195 A | 7/1973 | Beilke et al. | |
| 3,788,675 A | 1/1974 | Wilander | |
| 3,807,593 A | 4/1974 | Bourton | |
| 3,831,210 A | 8/1974 | Ow | |
| 3,885,691 A | 5/1975 | Knapp | |
| 4,058,325 A | 11/1977 | Schramm | |
| 4,065,825 A | 1/1978 | Cohen | |
| 4,098,347 A | 7/1978 | Honnold | |
| 4,128,258 A | 12/1978 | Johnson | |
| 4,168,932 A | 9/1979 | Clark | |
| 4,317,593 A | 3/1982 | Sarvela | |
| 4,415,300 A | 11/1983 | Boddicker | |
| 4,475,760 A * | 10/1984 | Morgan ..................... | 248/430 |
| 4,595,210 A | 6/1986 | Groeing | |
| 4,673,328 A | 6/1987 | Shiels | |
| 4,711,499 A | 12/1987 | Fortin | |
| 4,813,841 A | 3/1989 | Eischen | |
| 4,854,805 A | 8/1989 | Althoff et al. | |
| 4,968,210 A | 11/1990 | Friederich | |
| 5,161,814 A | 11/1992 | Walker | |
| 5,354,090 A * | 10/1994 | Grovom ..................... | 280/638 |
| 4,490,089 A | 12/1994 | Welker | |
| 5,984,340 A * | 11/1999 | Briscese .................. | 280/414.5 |
| 6,135,700 A | 10/2000 | Collins | |
| 6,332,627 B1 * | 12/2001 | Damron ..................... | 280/482 |

FOREIGN PATENT DOCUMENTS

| | | |
|---|---|---|
| EP | 0199652 | 10/1985 |
| GB | 2043556 | 10/1980 |
| JP | 58/78836 | 5/1983 |

* cited by examiner

*Primary Examiner*—Kevin Hurley
(74) *Attorney, Agent, or Firm*—Adrian D. Battison; Michael R. Williams; Ryan W. Dupuis

(57) ABSTRACT

A vehicle arranged for raising and lowering the frame relative to the ground wheels for loading comprises a vehicle frame with a hitch at a forward end of the frame and at least two ground wheels for supporting the frame for movement across the ground. Each wheel has a mounting assembly providing driven rotation of a hub carrying the wheel spindle from a raised height of the wheel to a lower locked position. The hub is driven by a hydraulic motor driving a pinion. A fender is mounted on hte vehicle frame for covering the wheel during transport, the fender including two interlocking portions thereof which are spring mounted so as to be movable relative to the wheel to accommodate the movement of the wheel to the raised position. The frame has a rear portion which is movable rearwardly to adjust the position of the load and the rear portion of the fender can be attached to the rear frame portion so as to be moved away from the wheel with movement thereof.

20 Claims, 9 Drawing Sheets

ADJUSTABLE VEHICLE WITH MOVING SECTION FOR LOAD TRANSFER

This application is a continuation of application Ser. No. 09/369,378 filed Aug. 6, 1999, now abandoned which is a continuation-in-part application of application Ser. No. 09/096,485 filed Jun. 10, 1998 now abandoned.

This invention relates to an improved vehicle, which may be a self propelled vehicle or a trailer which allows a bed of the vehicle carrying a load to move rearwardly as an extension portion so as to carry the load rearwardly. The invention is particularly but not exclusively concerned with a trailer which can move the load, such as a boat, rearwardly for unloading.

SUMMARY OF THE INVENTION

It is a one object of the present invention to provide an improved vehicle which allows a bed of the vehicle carrying a load to move rearwardly as an extension portion.

According to the invention there is provided a vehicle comprising;

a vehicle frame;

at least two ground wheels each attached to the frame by a mounting assembly for supporting the frame for movement across the ground;

the frame being divided into a front frame portion and a rear frame portion;

the ground wheels being attached to the front frame portion for supporting the front frame portion such that the rear frame portion is supported relative to the ground solely from the front frame portion;

the rear frame portion including support members mounted on the front frame portion and arranged so as to provide forward and rearward sliding movement of the support members and the rear frame portion relative to the front frame portion between a forward transport position and a rearward loading position;

the rear frame portion including rear load supporting frame members arranged beyond a rearward end of the front frame portion for supporting a rearward part of a load on the vehicle; and the rear frame portion including, in addition to the support members a foward load supporting frame member extending from the rear frame portion forwardly therefrom so as to be located, in the transport position, at a forward part of the front frame portion and arranged so as to engage and support a foward part of the load;

the rear load supporting frame members and the front load supporting frame member being arranged such that, as the rear frame portion is moved rearwardly, the load is engaged by and carried on the rear load supporting frame members and the front load supporting frame member and moves with the rear frame portion rearwardly relative to the front frame portion to the rearwardly loading position.

Further features of the invention provide a specific construction for the support members which carry the rear frame portion on the front frame portion and for the forward load supporting frame member of the rear frame portion.

Yet further features of the invention provide a fender arrangement in two parts which co-operates with the front and rear frame portions so that a rear portion moves rearwardly with the rear frame portion. This can be used with a moveable wheel assembly which raises and lowers the frame for loading and unloading.

BRIEF DESCRIPTION OF THE DRAWINGS

One embodiment of the invention will now be described in conjunction with the accompanying drawings in which:

FIG. 1 is a top plan view of the trailer according to the present invention with one side portion of the frame and the associated wheel thereon omitted for convenience of illustration.

FIG. 2 is a top plan view of a center portion only of the frame of FIG. 1 showing the frame in an extended position.

FIG. 3 is a side elevational view of the frame portion of FIG. 2.

FIG. 4 is a cross sectional view along the lines 4—4 of FIG. 2.

FIG. 5 is a top plan view, partly broken away, of the side portion only of the frame of FIG. 1 on an enlarged scale showing particularly the wheel mounting assembly.

FIG. 6 is view along the lines 6—6 of FIG. 5.

FIG. 7 is a view along the line 7—7 of FIG. 5 showing the wheel mounting assembly in the first raised position of the wheel axis.

FIG. 8 is a view similar of FIG. 7 showing the mounting assembly in the second lowered position of the wheel axis.

FIG. 9 is a top plan view of a wheel of the trailer of the above figures showing a fender for the wheel which is arranged to accommodate the lifting movement of the wheel.

FIG. 10 is a front elevational view of the wheel and fender of FIG. 9 showing the fender in a raised position.

FIG. 11 is a front elevational view of one part only of the fender of FIGS. 9 and 10 showing the fender in the normal locked operating position.

FIG. 12 is a front elevational view of a modified arrangement of the fender.

In the drawings like characters of reference indicate corresponding parts in the different figures.

DETAILED DESCRIPTION

The present invention relates generally to a vehicle which may be self propelled or may be designed as a trailer for attachment to a towing vehicle. The following description relates to a trailer which is a primary but not essential arrangement.

The frame of the embodiment comprises a first frame portion 10 and a second frame portion 11 which can be adjusted from an inwardly closed shorter position shown in FIG. 1 to an extended position shown in FIG. 2.

The first frame portion 10 comprises a first beam 12 and a second beam 13 which are parallel and parallel to a direction of longitudinal movement of the trailer as indicated at 14. The beams 12 and 13 are indicated by a first transverse beam 15 and a second rear transverse beam 17. At the front of the beams 12 and 13 is provided a pair of inwardly inclined beam portions 18 and 19 which converge to central apex at which is provided a hitch pole 20 extending forwardly from the frame for attachment to a towing vehicle.

The rear or second frame portion comprises a first load support beam 21 and a second load support beam 22. Each of first and second beams 21, 22 is formed of a first tubular portion 23 of the same dimensions as a tubular portion forming the beam 12,13 and a second tubular portion of reduced dimensions for sliding inside of the tubular portion defining the beam 12,13. Thus in the retracted position shown in FIG. 1, the end 24 of the portion 23 lies substantially immediately adjacent the end 25 of the beam 12. The beam 13 and the corresponding beam 22 of the second portion of the same construction.

Figure 3:
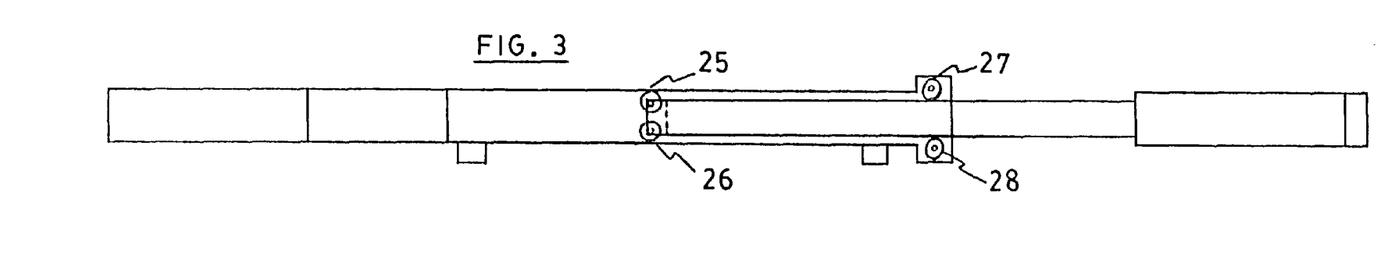
Figure 4:
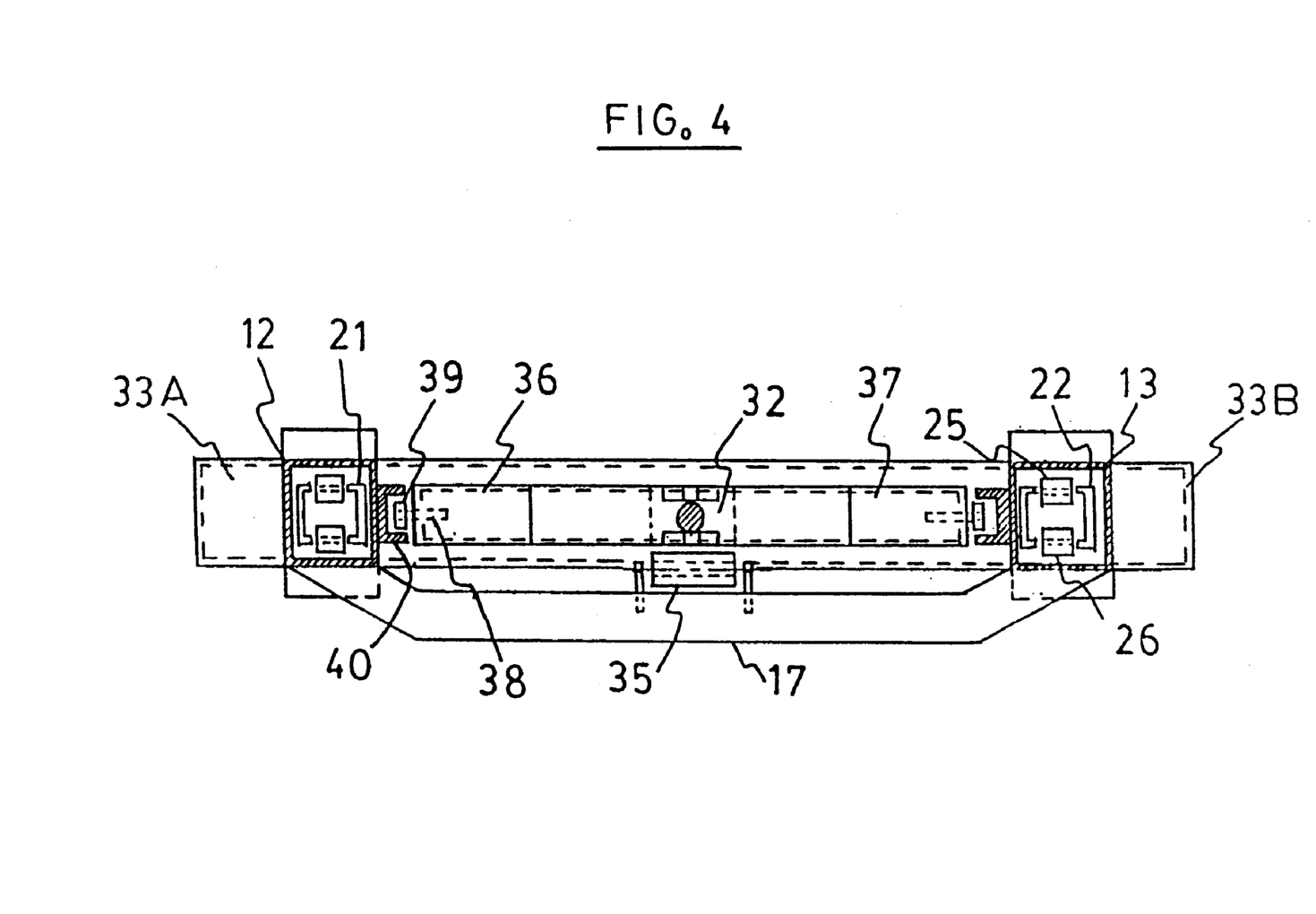

At the forward end of the smaller beam portion of the rear frame is provided a pair of guide rollers 25, 26 which roll on the inside surfaces of the top and bottom wall of the beam 12, 13 as best shown in FIG. 3.

At the rear end of the beams 12 and 13 is provided a pair of rollers 27, 28 20 which roll on the outside surface of the smaller portion of the beams 21, 22. Thus the smaller portions of the beam 21 and 22 are guided by the pair of rollers as best shown in FIG. 3 for sliding movement longitudinally of the beams 12, 13.

The longitudinal sliding movement of the rear portion 11 or of the front portion 12 is then effected by a cylinder schematically indicated at 29 which is connected between a coupling 30 at the rear end of the hitch pole 20 and a coupling 31 on the rear frame portion 11.

The rear frame 11 further includes a third load support beam 32 parallel to and coplanar with the beams 21 and 22. The three beams are connected by a transverse rear beam 33 defining a rear part of the frame with the rear beam extending outwardly beyond the beams 21 and 22 to form projecting portions 33A and 33B. The third load support beam 32 rides on a roller 35 carried on a rear upper part of the transverse beam 17. Forwardly of the roller 35, the load support beam 32 splits into two transverse members 36 and 37 which diverge outwardly in a Y-shape toward the beams 12 and 13. Adjacent the forward end of each of the transverse members is provided a horizontal shaft 38 each of which carries a roller 39 running within a channel guide track 40 mounted on an inwardly facing surface of the respective beam 12, 13. Thus the forward end of the third beam is guided by the tracks 40 and is supported against vertical movement relative to the front frame portion 10. The coupling 31 is located at the apex between the legs of the Y-shape.

Figure 1:
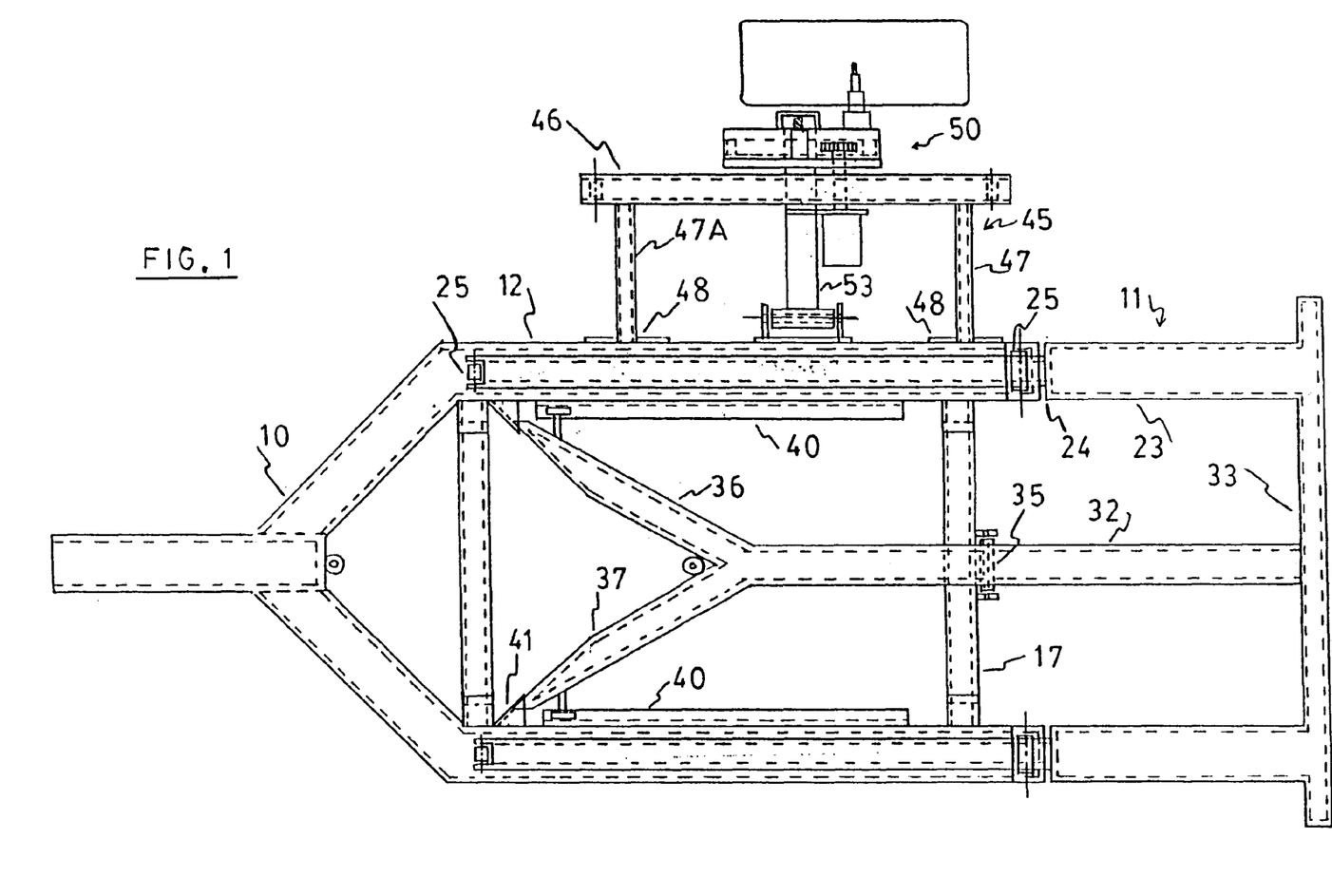
Figure 2:
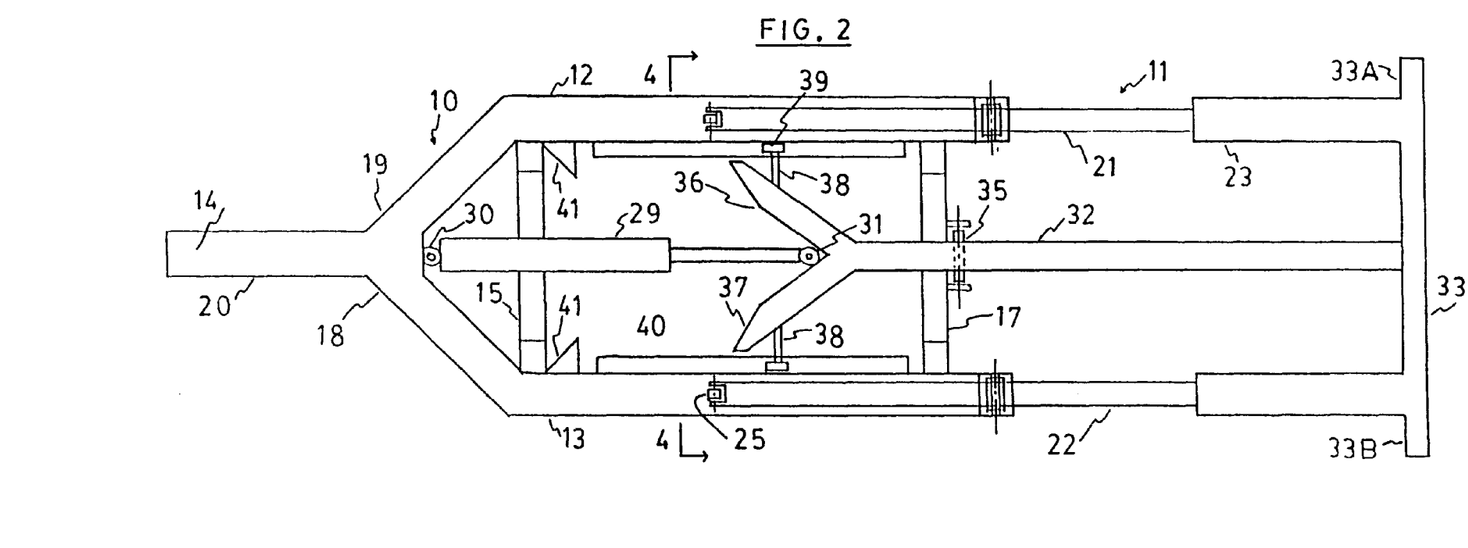

In this way the rear portion of the frame can be moved from the position shown in FIG. 1 which is the short position to the extend position shown in FIG. 2. During this movement the position of the beams of the frame are maintained in forward position so that the frame remains coplanar and is structurally sound. In the retracted position shown in FIG. 1, the pointed end of each of the transverse member 36, 37 engages into a triangular receptacle 41 carried on the inwardly facing surface of the beam 12,13.

The complete frame section is defined by the front portion 10 and the rear portion 11 is supplemented by a pair of side frame portion generally indicated at 45. The righthand frame as shown in FIG. 1 but the left hand frame is omitted for convenience of illustration. Each frame portion comprises a horizontal beam 46 which is supported on the respective beam 12, 13 of the front portion 10 by a pair of inclined support struts 47, 47A. Each of the struts 47, 47A is attached to a plate 48 at its inner end bolted or otherwise fastened to the outside surface of the beam 12. Thus the beam 46 is supported at a height raised from the horizontal plane of the main frame. The beam 46 is however rigidly attached to the main frame and remains in fixed position relative to thereto.

The frame thus constructed by a pair of wheel assemblies generally 10 indicated at 50. Again the right hand wheel assembly is shown in FIG. 1 and the left hand wheel assembly is omitted for convenience of illustration. It will be appreciated that the frame portion 45 and the wheel 50 of the right is symmetrical relative to the same elements on the left hand side.

The wheel assembly 50 comprises a ground wheel 51, a wheel mounting assembly 52, a pivot arm 53 and a leaf spring 54.

The pivot arm 53 is pivotally connected by a bracket 55 attached to the beam 1 by a plate 56 intermediate the plate 48. The arm 53 can thus pivot upwardly and downwardly in a suspension movement of the wheel against the bias of the spring 54 attached to the beam 46 by couplings 54A.

Other types suspension can be used depending upon requirements and the present invention is not limited to the particular type of suspension shown and described herein.

The arm 53 projects beyond its connection to the base of the leaf spring 54 and thus provides a support for the wheel mounting 52. The wheel mounting 52 comprised a first member 60 in the form of a substantially vertical plate welded or otherwise attached to an outer end 61 of the arm 53 and standing upwardly therefrom so the arm is attached to the bottom of the plate 60. The plate carries a spindle 62 projecting forwardly from the plate at a position directly above the arm and extending horizontally from the plate when the plate stands vertical. The angle of the plate varies during suspension movement.

The mounting assembly 52 further includes a hub 63 forming a second member of the mounting assembly which is movable relative to the first member. The hub 63 includes a central ring 64 mounted on the spindle 62 for rotation about a rotation axis 65 defined by the spindle 62. The hub 63 carries a spindle 66 for the wheel 51 defining a wheel axis 67 about which the wheel rotates on the spindle 65. The spindle 66 is located at a position spaced from the spindle 62 with the axes 65 and 67 substantially parallel.

The hub 63 includes and outer ring 68 surrounding the axis 65 with the outer ring including an inwardly facing gear 69. A pinion 70 is mounted on a shaft 71 extending through the plate 60 and carried thereby on suitable bearings. The shaft 71 is parallel to the axis 65 and drives the pinion in rotation about the axis of the shaft so as to drive the gear 69 in rotation around the axis 65. The shaft 71 is driven by a hydraulic motor 72 carried on a support plate 73 attached to the arm 53 of a position thereon spaced from the plate 60 and inwardly of the spring 54. The plate 73 is based by a triangular base 74.

Figure 5:
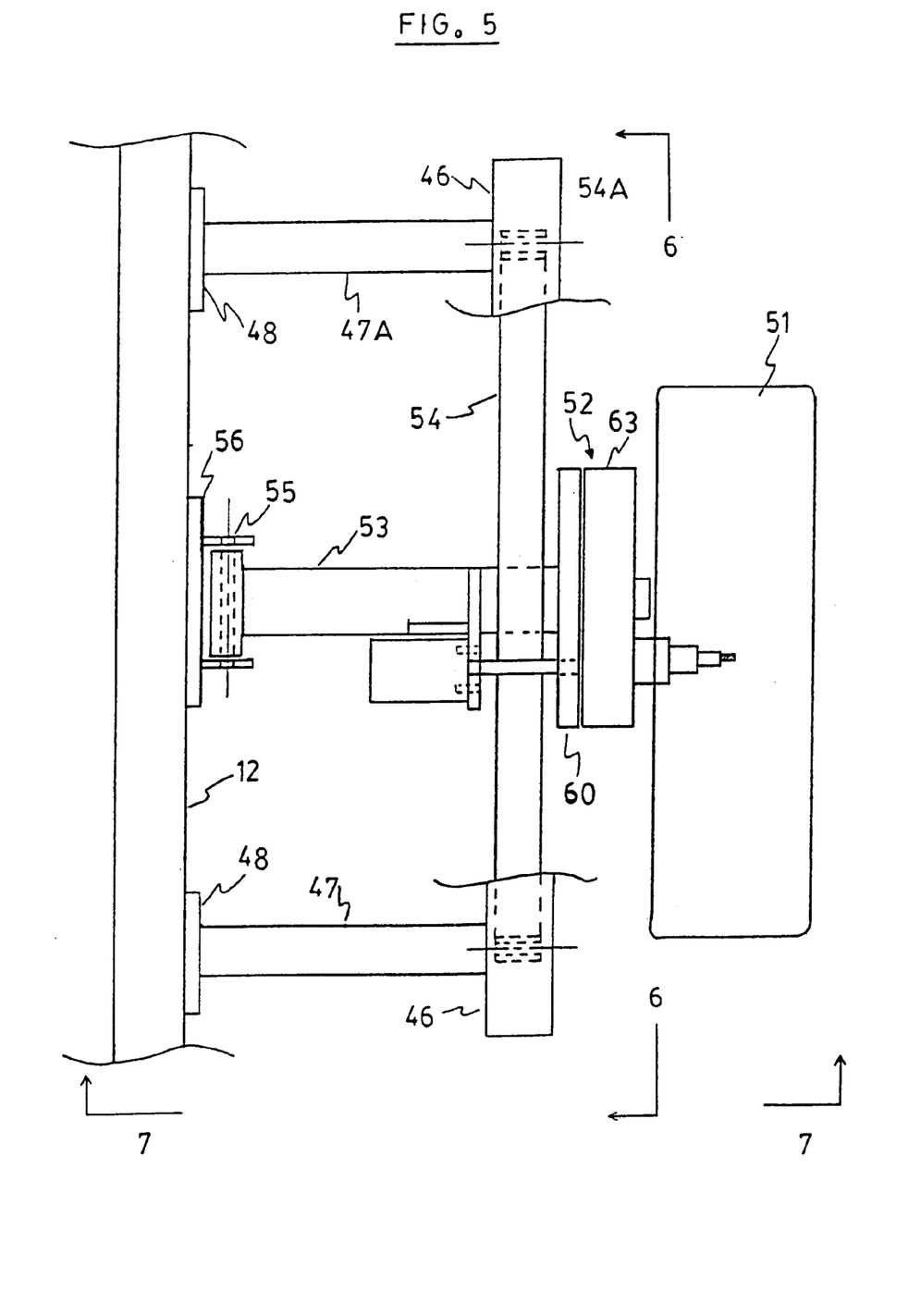
Figure 6:
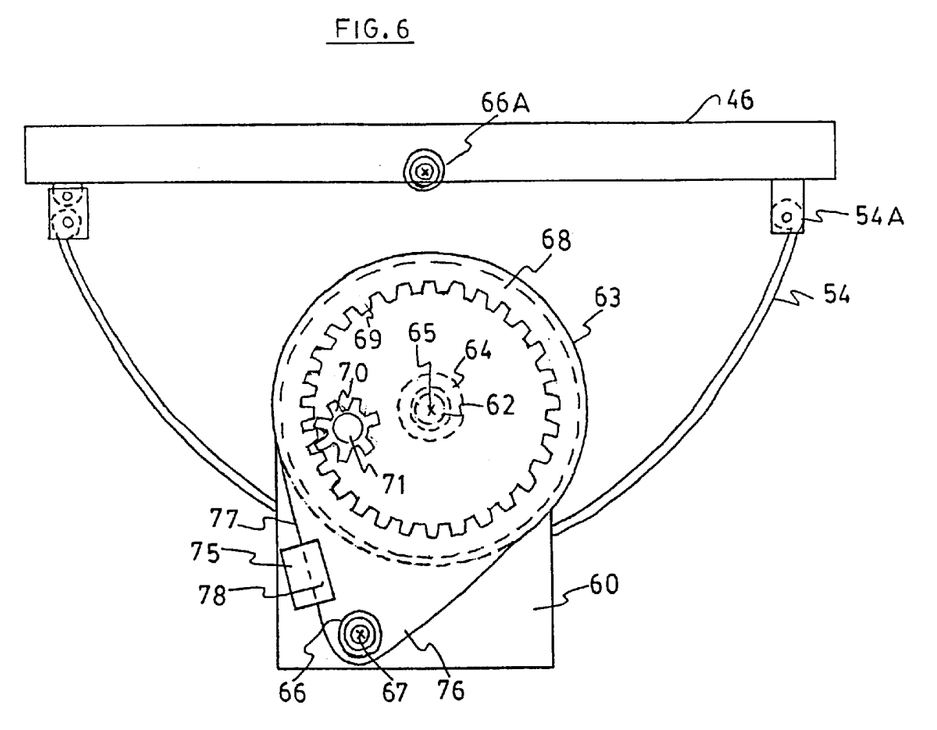
Figure 7:
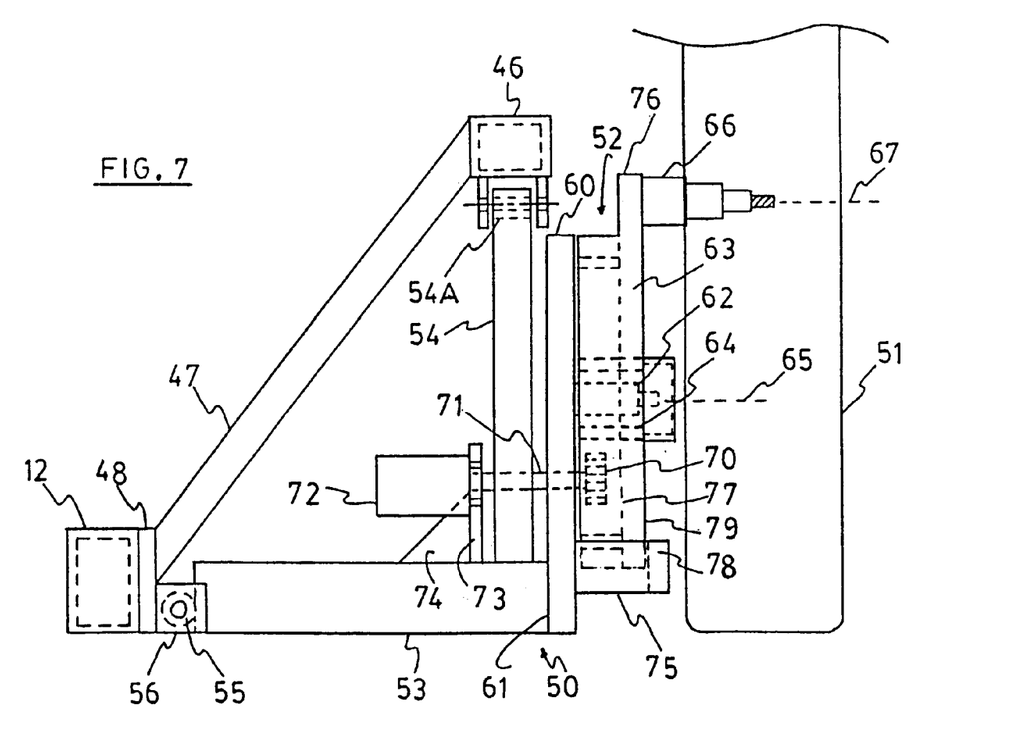
Figure 8:
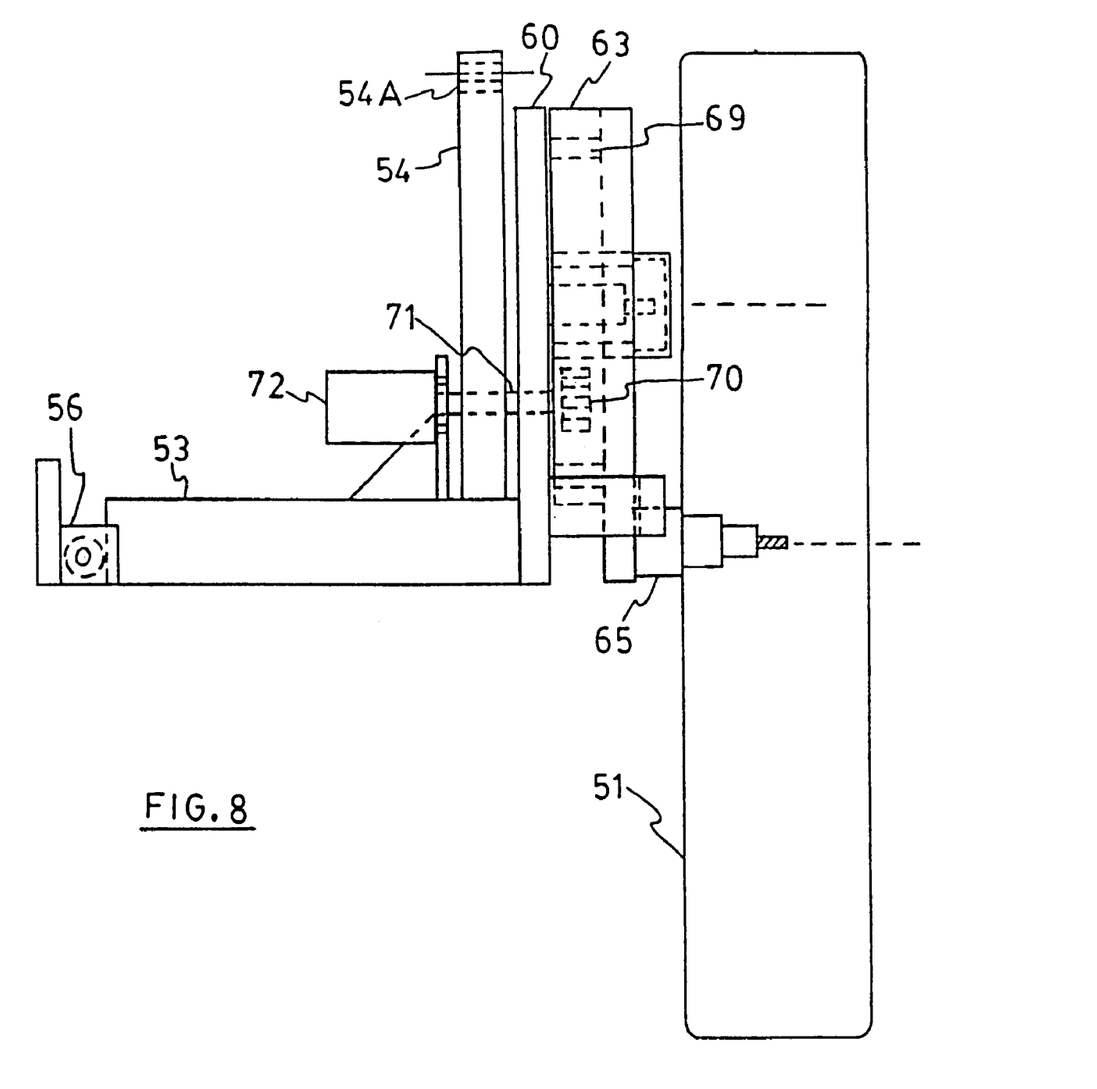

Rotation of the shaft 71 effected by the hydraulic motor 72 thus causes the pinion to drive the hub 63 around the axis 65 from the first raised position of the spindle 66 as shown in FIG. 7 to the second lowered position of the spindle 66 as shown in FIGS. 5, 6 and 8.

In the raised position of the spindle 66 as shown in FIG. 7, the spindle is moved to a top center position directly above the axis 65. In this position the wheel 51 is raised relative to the frame. The wheel 51 has a diameter arranged that such that in raised position shown in FIG. 7 the frame is substantially at or adjacent ground height so that a load can be moved directly on to the trailer. The spindle 66 tends to center itself over the axis 65 due to the loading of the wheel on the hub 63 which tend to pull the hub upwardly in rotation relative to the plate 60.

When the trailer is loaded, the motor 72 is actuated to drive the shaft 71 causing the pinion the drive the gear in a direction rotating the hub 63 from the 12 o'clock position illustrated in dotted line at 66A in FIG. 6 to the 6:30 position shown in full line in FIG. 6. Thus the spindle 66 in the lowered position goes just beyond the bottom centered position that is slightly over-center until the hub 63 engages against a stop 75 carried on the plate 60. Thus the hub 63 includes a lobe 76 projecting outwardly to one side of the ring 68 with the lobe defining a side wall 77 which engages against the stop 75. The stop forms a surface which is oriented to engage the surface 77 when the lobe moves to the required position holding the spindle 66 at the 6:30 position.

In addition the stop 75 includes an end plate portion 78 projecting beyond a front face 79 of the hub 63. The end plate portion 78 defines a lip which is in sliding contact with the front face 79 so as to hold that front face against movement away from the plate 60. The lip 78 thus takes loading from the spindle 62 and insures that excessive loading on the spindle 66 tending to twist the bottom of the hub away from the plates 60 is resisted by the inter-engagement between the lip 78 and the surface 79.

The trailer therefore the present invention allows the frame of the trailer to be lowered to the ground for loading and the frame of the trailer to be lifted for transport. The lifting action is effected using hydraulic action without operator involvement in latching or unlatch elements.

In addition the trailer can be adjusted in length by rearward extension of a rear portion relative to a forward portion to move the load rearwardly on the rear portion, with the whole of the frame being movable in the vertical direction for the loading action.

Figure 9:
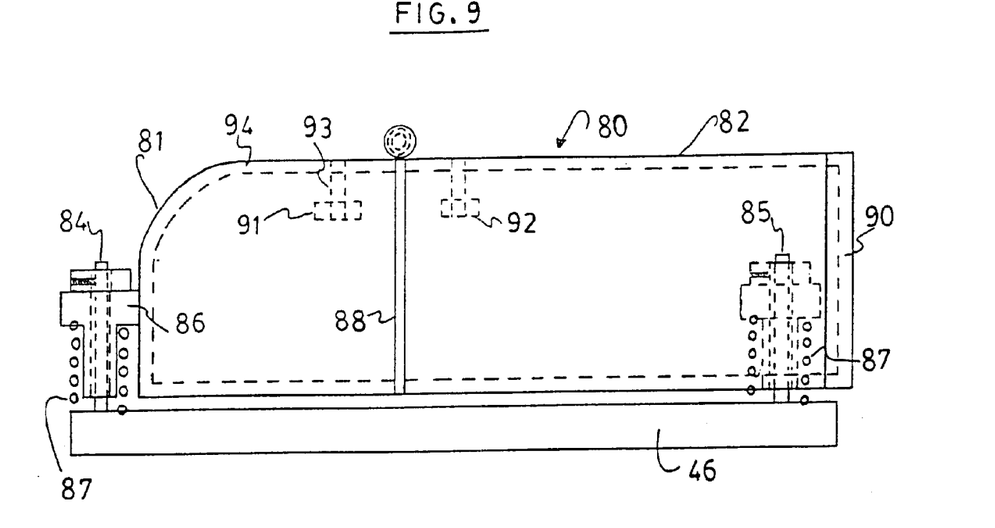
Figure 10:
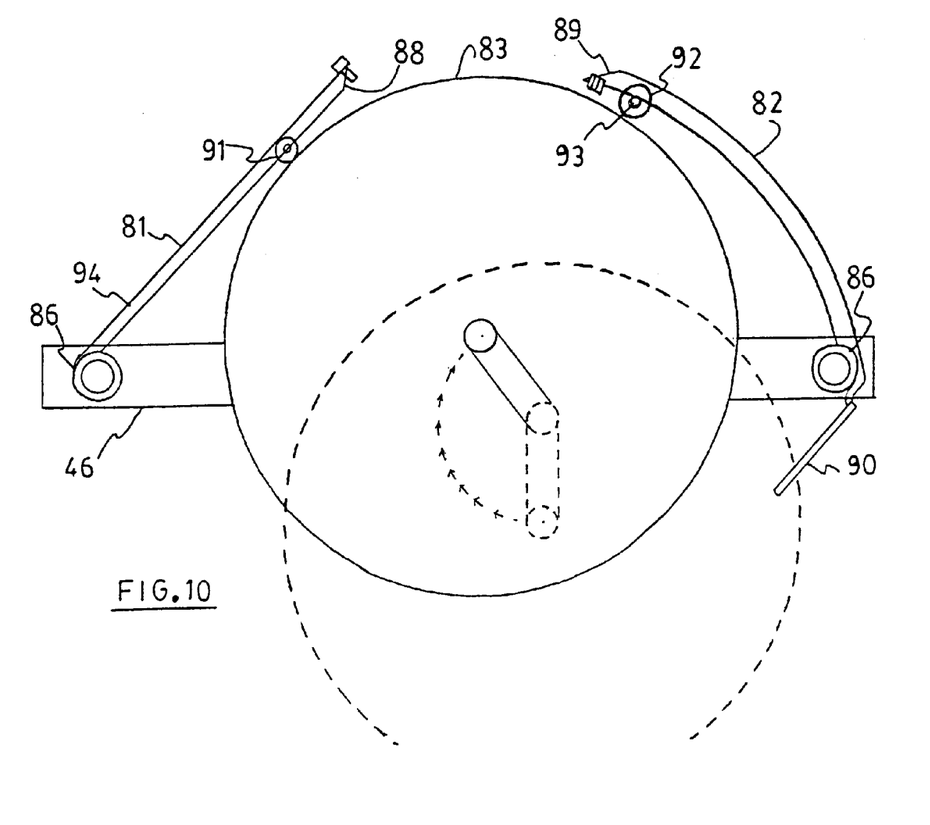
Figure 11:
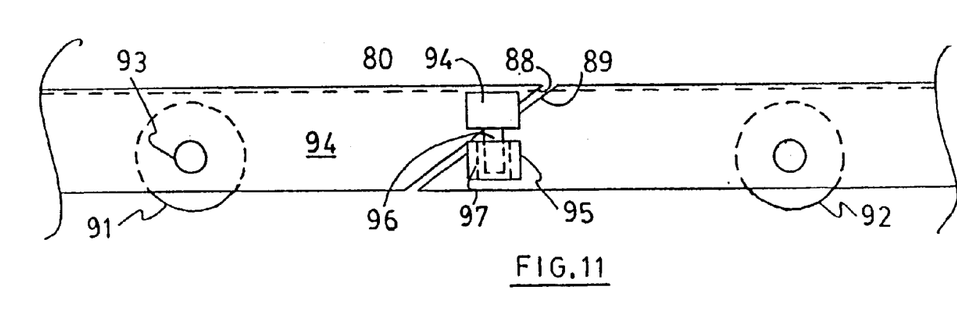

Turning now to FIGS. 9, 10 and 11 there is shown a fender for the trailer as shown and described above. During upward movement of the wheel for the lowering of the trailer frame to the ground, it is necessary for the fender to accommodate this upward movement. The normal position of the fender just above the wheel during transport movement of the trailer is necessary to prevent release of water, mud and other materials from the road and therefore in the normal position of the trailer, the fender is closely adjacent the wheel. When the wheel is raised, however, the fender must accommodate this movement.

One technique for accommodating movement is shown in FIGS. 9, 10 and 11 wherein there is provided a fender 80 forming two parts 81 and 82. The fender is mounted on the frame member 46 and projects outwardly therefrom over the wheel 83.

Each fender piece 81, 82 is mounted on a respective one of a pair of pins 84 and 85 mounted on a projecting outwardly from the frame member 46. Thus each fender piece 81, 82 includes a sleeve 86 surrounding the respective pin which is attached to the fender portion by any suitable technique such as welding. The sleeve 86 is arranged at the forward end of the portion 81 and at the rearward end of the portion 82. The sleeve can thus rotate around the pin allowing the fender portion to raise and lower as required. A spring 87 biases the fender portion into the lowered position.

The fender portion 81 is the forward portion and extends from the sleeve 86 on the pin 84 to a rearward edge 88 which is chamfered as indicated in FIG. 10.

The rearward portion 82 has a forward chamfered end 89 which matches the chamfered end 88 so that the end 88 rests over the end 89. The sleeve 86 of the portion 82 is arranged at the rearward end and behind the sleeve is provided a downwardly depending mud flap 90. Each portion carries a roller 91, 92 which contacts the peripheral surface of the wheel as the wheel is raised upwardly so as to push the portions upwardly as the wheel is raised. The roller is carried on a pin 93 projecting inwardly from an outer flange 94 of the fender.

The fender portions can be locked in place by a pair of locking members 94 and 95 mounted on one edge of the fender, which can be the inside edge, the outside edge or both edges, at the chamfered edges 88 and 89. The locking member 94 comprises an upper cap portion carrying a depending pin 96. The lower locking member 95 comprises a sleeve having an internal bore 97 into which the pin 96 seats. Thus locking members are held together during normal operation so that the fender remains as a single unit during travel without a tendency of the rear part to open or lift or flap as the wind flows over the fender. At the time of raising the wheels, the front portion lifts first so that the pin 96 is pulled out of the rear portion to allow both fender portions to be pushed upwardly as shown in FIG. 10.

Figure 12:
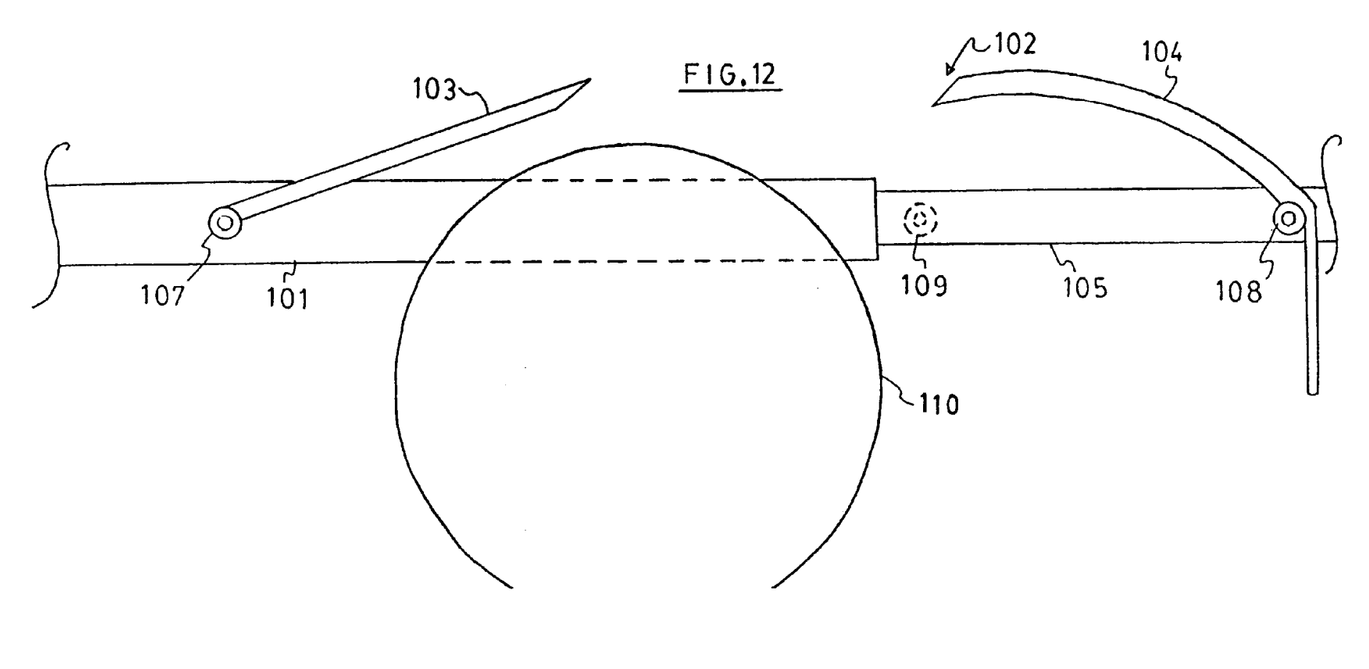

An alternative arrangement is shown in FIG. 12 where the side frame member 101 carries the fender generally indicated at 102 formed by two fender portions 103 and 104 substantially as previously described. In this embodiment the frame member 101 includes an extension portion 105 which slides inside the tubular frame member 101 so as to allow the frame member to extend. In this embodiment the front portion 103 is mounted on a sleeve and pin arrangement 107 as previously described. In this embodiment the rear portion 104 is fixed on a similar sleeve and pin arrangement as indicated at 108. The sleeve and pin 107 is mounted on the frame members 101. The sleeve and pin 108 is mounted on the frame member 105 and is therefore movable rearwardly as the frame is extended by pulling out the extension portion 105. The sleeve and pin arrangement 108 therefore moves from an initial position as shown at 109 in the normal operating position of the fender to an extended position as shown at 108. In this embodiment, therefore, instead of the rear portion pivoting upwardly on the spring, the rear portion remains at a fixed height but is instead moved horizontally away from the position of the wheel 110 allowing the wheel to move upwardly and providing a pushing action only on the forward portion 103.

The fender can also be designed for use with a dual or multi axle arrangement in which two or more wheels are arranged each behind the next. In this arrangement, the length of one or both portions of the fender is increased to accommodate the full area over the wheels. Alternatively a plurality of individual fenders are provided, one for each wheel.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A vehicle comprising:

a vehicle frame;

at least two ground wheels each attached to the frame by a mounting assemly for supporting the frame for movement across the ground;

the frame being divided into a front frame portion and a rear frame portion;

the ground wheels being attached to the front frame portion for supporting the front frame portion such that the rear frame portion is supported relative to the ground solely from the front frame portion;

the rear frame portion including support members mounted on the front frame portion and arranged so as to provide forward and rearward sliding movement of the support members and the rear frame portion relative to the front frame portion between transport position anda rearward loading position;

the rear portion including rear load supporting frame members arranged beyond a rearward end of the front frame portion and arranged to support a rearward part of a load on the vehicle;

and the rear frame portion including, in addition to the support members a forward load supporting frame member extending from the rear frame portion forwardly therefrom so as to be located, in the transport position, at a forward part of the front frame portion and arranged so as to engage and support a forward part of the load;

the rear load supporting frame members and the front load supporting frame members being arranged such that, as the rear frame portion is moved rearwardly, the load is engaged by and carried on the rear load supporting frame members and the front load supporting frame member and moves with the rear frame portion rearwardly relative to the front frame portion to the rearward loading position.

2. The vehicle accoriding to claim 1 wherein each ground wheel includes a respective munting assembly comprising a first member connected to the frame for movement therewith and a second member having the ground wheel mounted thereon for rotation about a wheel axis, the second memeber being movably mounted on the first member so as to move the wheel axis from a first raised position in which the frame is lowered to a position at or adjacent the ground to a second transport position lower than the first position in which the frame is raised for transport, and wherein there is provided a fender mounted on the vehicle frame for covering the wheel during transport, the fender including at least a fender portion thereof which is movable relative to the frame to accommodate the movement of the wheel to the raised position.

3. The vehicle according to claim 2 wherein the fender portion is mounted for pivotal movement about a generally horizontal axis to move from a lowered transport position when the wheel is in the transport position thereof upwardly with the wheel when contracted by the wheel.

4. The vehicle according to claim 3 wherein the fender includes two fender portions divided at a line above the wheel each of which is mounted for pivotal movement about a respective pivot axis from the transport position.

5. The vehicle according to claim 4 wherein the fender portions include a locking device for locking the two fender portions together in the transport position.

6. The vehicle according to claim 4 wherein the two fender portions are spring biased into the transport position.

7. The vehicle according to claim 4 wherein the two fender portions define a front portion pivotally mounted in front of the wheel and a rear portion pivotally mounted behind the wheel.

8. The vehicle according to claim 2 wherein the fender portion includes a roller for engaging the wheel.

9. The vehicle according to claim 2 wherein the fender includes a fist fender portion mounted on the front portion of the frame for pivotal movement relative thereto and a senocnd fender portion mounted on the rear portion of the frame so as to be movable therewith to a position spaced away from the wheel to allow the upward movement of the wheel.

10. The vehicle according to calim 9 wherein the first fender portion and the second fender portion meet at a position above the wheel when the rear frame portion is in the transport position.

11. The vehicle according to claim 1 wherein there is provided a fender on each side of the frame,the fender including a first fender portion mounted on the rear frame portion for movement therewith and a second fender portion mounted on the front frame portion and wherein the first fender portion and the second fender portion meet at a position above the wheel when the rear portion is in the transport position.

12. A vehicle comprising;

a vehicle frame;

at least two ground wheels attached to the frame by a mounting assembly for supporting the frame fro movement across the ground;

the frame being divided into a front frame portion and a rear frame portion;

the ground wheels being attached to the front frame portion for supporting the front frame portion such that the rear frame portion is supported relative to the ground solely from the front frame portion;

the rear frame portion being mounted on the front frame portion for forward and rearward sliding movement relative thereto between a forward transport position and a rearward loading position;

the front frame portion including two parallel elongate front support members extending longitudinally of the frame and spaced across the frame;

the rear frame portion including two parallel elongate rear support members extending longitudinally of the frame and sapced across the frame;

each of the rear support members being mounted on a respective on of the front support memebers for longitudinal sliding movement relative thereto as said rear frame portion moves in said sliding movement;

the rear support members including rear load supporting frame members arranged beyond a rearward end of the front frame portion arranged to engage and support a rearward part of a load on the vehicle;

and the rear frame portion including a forward load supporting frame member located between the front support members at a forward part of the front frame portion arranged to engage and support a forward part of the load;

the rear load supporting frame members and the front load supporting frame member being arranged such that, as the rear frame portion is moved rearwardly, the load is engaged on and supported by the rear load supporting frame members and the front load supporting frame member and moves with the rear frame portion rearwardly relative to the front frame portion to the rearward loading position.

13. The vehicle according to claim 12 wherein the forward load supporting frame member of the rear frame portion comprises a third elongate support member parallel to and between the two rear support members, the third support member having means thereon for rolling on a support provided by the front frame portion.

14. The vehicle according to claim 13 wherein the third support member has a pair of transverse members extending transversely toward the two elongate support members of the front frame portion respectively, each of the transverse members having means thereon for rolling on a support attached to a respective one of the two elongate support members of the front frame portion.

15. The vehicle according to claim 14 wherein the transverse members form with the third beam in plan view a Y-shape.

16. The vehicle according to claim 14 wherein each of the transverse members has a transversely extending roller thereon for engaging into a track carried on a inside surface of a respective one of the two elongate support members of the front frame portion.

17. The vehicle according to claim 13 wherein the front frame portion includes a transverse beam for engaging and supporting the third support member.

18. The vehicle according to claim 12 wherein the front support members each comprise a front beam and the rear support members each comprise a rear beam slidable along the respective front beam and wherein each rear beam includes a pair of rollers for engaging upper and lower surfaces respectively of the respective front beam and wherein an end of each front beam has rollers thereon for engaging the upper and lower surfaces respectively of the respective rear beam.

19. The vehicle according to claim 12 wherein there is provided a fender on each side of the frame, the fender including a first fender portion mounted on the rear frame portion for movement therewith and a second fender portion mounted on the front frame portion and wherein the first fender portin and the second fender portion meet at a position above the wheel when the rear portion is in the transport position.

20. The vehicle according to claim 12 wherein each group wheel includes a respective mounting assembly comprising a first member connected to the frame for movement therewith and a second member having the ground wheel mounted thereon for rotation about a wheel axis, the second member being movably mounted on the first member so as to move the wheel axis from a first raised position in which the frame is lowered to a position at or adjacent the ground to a second transport position lower than the first position in which the frame is raised for transport, and wherein there is provided a fender mounted on the vehicle frame for covering the wheel during transport, the fender including at least a fender portion thereof which is movable relative to the frame to accommodate the movement of the wheel to the raised position.

* * * * *